(12) United States Patent
Koo et al.

(10) Patent No.: US 11,109,640 B2
(45) Date of Patent: *Sep. 7, 2021

(54) SHOE OUTSOLE MADE USING COMPOSITE SHEET MATERIAL

(71) Applicant: Dynasty Footwear, Ltd., El Segundo, CA (US)

(72) Inventors: John Koo, Los Angeles, CA (US); Jonathan Goldberg, Los Angeles, CA (US)

(73) Assignee: Dynasty Footwear, Ltd., El Segundo, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/583,472

(22) Filed: Sep. 26, 2019

(65) Prior Publication Data

US 2020/0015545 A1 Jan. 16, 2020

Related U.S. Application Data

(60) Continuation of application No. 14/064,131, filed on Oct. 26, 2013, now abandoned, which is a (Continued)

(51) Int. Cl.
| | |
|---|---|
| *A43B 13/22* | (2006.01) |
| *A43B 13/02* | (2006.01) |
| *A43B 1/02* | (2006.01) |
| *A43B 1/06* | (2006.01) |
| *A43B 13/12* | (2006.01) |
| *B29D 35/14* | (2010.01) |

(52) U.S. Cl.
CPC ............... *A43B 13/02* (2013.01); *A43B 1/02* (2013.01); *A43B 1/06* (2013.01); *A43B 13/026* (2013.01); *A43B 13/12* (2013.01); *A43B 13/122* (2013.01); *A43B 13/223* (2013.01); *B29D 35/142* (2013.01)

(58) Field of Classification Search
CPC ....... A43B 13/223; A43B 13/22; A43B 13/24; A43B 13/26; A43B 13/02; A43B 1/02; A43B 1/06

See application file for complete search history.

(56) References Cited

U.S. PATENT DOCUMENTS

| | | |
|---|---|---|
| 1,978,030 A | 10/1934 | Ritchie |
| 1,989,467 A | 1/1935 | Schaffer |

(Continued)

FOREIGN PATENT DOCUMENTS

| | | |
|---|---|---|
| CN | 98234514.3 | 12/1999 |
| GB | 2 201 082 | 8/1988 |

(Continued)

OTHER PUBLICATIONS

Prosecution history of, including prior art cited in, parent U.S. Appl. No. 11/530,419, filed Sep. 8, 2006 (now U.S. Pat. No. 8,661,713).

*Primary Examiner* — Ted Kavanaugh
(74) *Attorney, Agent, or Firm* — Joseph G Swan, PC

(57) ABSTRACT

Provided are, among other things, systems, methods and techniques for making a shoe outsole and to shoe outsoles made using such techniques. In one such technique, a sheet of composite material is produced by extruding a base material together with a sheet of fabric material. The sheet of composite material is then cut into an outsole component, and a shoe outsole is fabricated using the outsole component.

16 Claims, 8 Drawing Sheets

Related U.S. Application Data continuation-in-part of application No. 13/543,858, filed on Jul. 8, 2012, now abandoned, which is a continuation of application No. 12/898,550, filed on Oct. 5, 2010, now Pat. No. 8,234,736, which is a division of application No. 12/408,702, filed on Mar. 22, 2009, now Pat. No. 7,827,640, which is a division of application No. 11/751,581, filed on May 21, 2007, now Pat. No. 7,516,506, said application No. 14/064,131 is a continuation-in-part of application No. 11/530,419, filed on Sep. 8, 2006, now Pat. No. 8,661,713.

(60) Provisional application No. 60/803,351, filed on May 26, 2006, provisional application No. 60/896,315, filed on Mar. 22, 2007, provisional application No. 60/745,926, filed on Apr. 28, 2006.

(56) References Cited

U.S. PATENT DOCUMENTS

| | | |
|---|---|---|
| 2,287,282 A | 6/1942 | Tousley |
| 2,400,487 A | 5/1946 | Clark |
| 2,663,097 A | 12/1953 | Giese, Jr. |
| 2,793,136 A | 5/1957 | Root |
| 3,698,357 A | 10/1972 | Spencer |
| 3,776,753 A | 12/1973 | Habib |
| 3,798,048 A | 3/1974 | Brody et al. |
| 3,824,715 A | 7/1974 | Vaughan, Jr. et al. |
| 4,160,331 A | 7/1979 | Bell |
| 4,356,643 A | 11/1982 | Kester et al. |
| 4,535,121 A | 8/1985 | Oezelli et al. |
| 4,640,858 A | 2/1987 | Barnett |
| 4,658,514 A | 4/1987 | Shin |
| 4,779,360 A | 10/1988 | Bible |
| 4,879,969 A | 11/1989 | Haranoya et al. |
| 4,899,411 A | 2/1990 | Johnson et al. |
| 4,963,422 A | 10/1990 | Katz et al. |
| 5,108,777 A | 4/1992 | Laird |
| 5,290,607 A | 3/1994 | Chitouras |
| 5,977,014 A | 11/1999 | Plischke et al. |
| 6,106,920 A | 8/2000 | Pichon et al. |
| 6,214,141 B1 | 4/2001 | Kim et al. |
| 2004/0163190 A1 | 8/2004 | Loughran |

FOREIGN PATENT DOCUMENTS

| | | |
|---|---|---|
| JP | S59-362 | 1/1984 |
| JP | H3-170101 | 7/1991 |

SHOE OUTSOLE MADE USING COMPOSITE SHEET MATERIAL

This application is a continuation in part of U.S. patent application Ser. No. 14/064,131, filed Oct. 26, 2013, which: (1) is a continuation in part of U.S. patent application Ser. No. 13/543,858, filed Jul. 8, 2012, which is a continuation of U.S. patent application Ser. No. 12/898,550, filed Oct. 5, 2010 (now U.S. Pat. No. 8,234,736), which is a division of U.S. patent application Ser. No. 12/408,702, filed Mar. 22, 2009 (now U.S. Pat. No. 7,827,640), which is a division of U.S. patent application Ser. No. 11/751,581, filed May 21, 2007 (now U.S. Pat. No. 7,516,506), which claimed the benefit of U.S. Provisional Patent Application Ser. No. 60/803,351, filed May 26, 2006, and U.S. Provisional Patent Application Ser. No. 60/896,315, filed Mar. 22, 2007; and (2) is a continuation in part of U.S. patent application Ser. No. 11/530,419, filed Sep. 8, 2006 (now U.S. Pat. No. 8,661,713), which claimed the benefit of U.S. Provisional Patent Application Ser. No. 60/803,351, filed May 26, 2006, and U.S. Provisional Patent Application Ser. No. 60/745,926, filed Apr. 28, 2006. All of the foregoing applications are incorporated by reference herein as though set forth herein in full.

FIELD OF THE INVENTION

The present invention pertains to footwear and, more particularly, to shoe outsoles and to methods for making shoe outsoles.

BACKGROUND

A variety of different techniques for making shoe soles exist. Examples include injection molding the sole as a unitary piece, bonding layers of different material together to form the shoe's sole and use of vulcanization techniques.

In addition, a variety of different processing techniques have been used to provide the shoe's sole with particular characteristics and/or to obtain advantageous import duty rates that typically apply to shoes having an outsole in which at least 50% of the ground-contacting surface is made of a natural material. Examples of such processing techniques include molding fabric or other natural materials into the shoe's outsole and flocking the shoe's outsole with natural fabric fibers.

However, improvements in the structures of shoe outsoles, as well as the production techniques for making them, remain desirable.

SUMMARY OF THE INVENTION

The present invention addresses this need by providing shoe outsoles and techniques for making shoe outsoles which utilize a composite sheet material (e.g., fabric or fabric fibers embedded into a base material).

Thus, in one aspect the invention is directed to systems, methods and techniques for making a shoe outsole and to shoe outsoles made using such techniques. In one such technique, a sheet of composite material is produced by extruding a base material together with a sheet of fabric material. The sheet of composite material is then cut into an outsole component, and a shoe outsole is fabricated using the outsole component.

In another, a base material is extruded into a sheet of base material. Then, individual fibers are deposited onto a surface of the sheet of base material before the sheet of base material has fully hardened. The fibers are pressed into the surface of the sheet of base material in order to form a sheet of composite material, and the sheet of composite material is cut into an outsole component. Finally, a shoe outsole is fabricated using the outsole component.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Generally speaking, the present invention pertains to a composite sheet material that has a plurality of individual fibers or a piece of fabric material embedded within a non-fibrous base material, to techniques for manufacturing such a composite sheet material, to the use of such a composite sheet material in the construction of a shoe outsole, and to shoe outsoles made using such techniques.

In this regard, it often is desirable to manufacture a shoe sole having a composite surface, including some areas in which one type of material contacts the ground and other areas in which another type of material contacts the ground. For example, the first type (e.g., the shoe outsole's base material) might be a synthetic rubber or other polymer that ordinarily is used as a material for forming a shoe's outsole, while the second type might be a plurality of natural or synthetic fibers or a piece of natural or synthetic fabric. In the present disclosure, the term "fabric material" is used in its normal sense of referring to a woven or non-woven material that resembles cloth, with its individual fibers bound together, while the term "fibers" refers to distinct particles or strands that generally are not bound together.

The techniques of the present invention can be applied with respect to either individual fibers or fabric material. Such individual fibers and fabric material collectively are referred to herein as "fibrous material".

Figure 1:
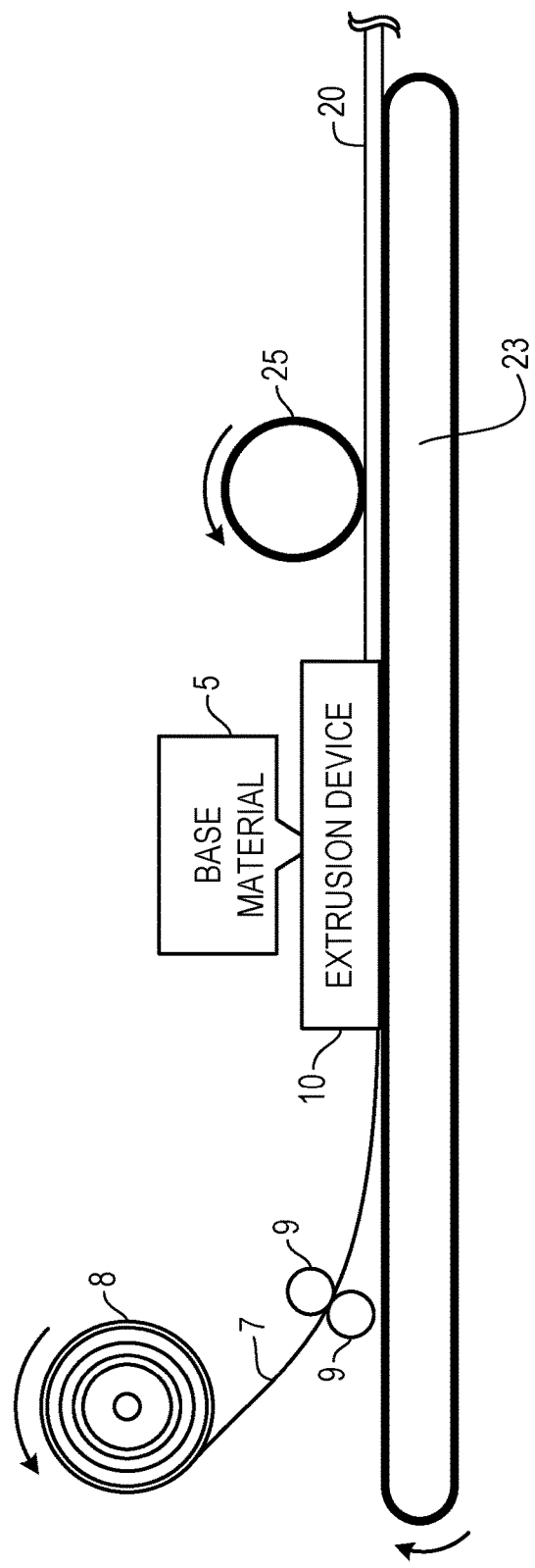
FIG. 1 is a right side conceptual view of a system for making a composite sheet material according to a first representative embodiment of the present invention.

Specifically, the present invention contemplates two general categories of manufacturing such a composite material. In the first, an example of which being illustrated in FIG. 1, both a non-fibrous material (the base material 5) and a fibrous material (fabric sheet material 7 taken from roll 8 and guided using guiding rollers 9) are fed together through an extrusion device 10 (e.g., a conventional extrusion device that ordinarily is used for manufacturing sheets of non-fibrous material). Various kinds of fabric sheet material 7 that may be used are mentioned above. The base material 5 can include, e.g., polyvinyl chloride (PVC), acrylonitrile butadiene styrene (ABS), thermoplastic rubber (TPR), ethylene vinyl acetate (EVA), a polyurethane elastomer, natural or synthetic rubber, synthetic leather, any polymer or any type of plastic.

A conventional extrusion device 10 typically is used to fabricate long objects of a fixed cross-sectional profile, such as plastic sheet material, by pushing and/or drawing liquid or semi-liquid material through a die of the desired profile shape. As noted above and as shown in FIG. 1, the present embodiment of the invention modifies the conventional process, in part, by feeding fabric sheet material 7 through the extrusion device 10 together with the liquid or semi-liquid base material 5. As the composite sheet material 20 exits extrusion device 10, it typically is carried along a conveyor 23, cooled or otherwise allowed or forced to harden, and then cut to the desired length. One or more rollers 25 also may be used for additional shaping and/or for facilitating the cooling process of the composite sheet material 20 that is produced by extrusion device 10.

According to the present embodiment of the present invention, where a fabric material 7 is being used to produce the composite sheet material 20, the fabric material preferably is fed through the extrusion die and/or underneath the roller 25 together with the liquid or semi-liquid non-fibrous base material 5, so that the resulting material 20 has the desired composite composition. Preferably, the fabric material 7 is inserted underneath the liquid or semi-liquid non-fibrous base material 5, so that once the non-fibrous base material 5 hardens, the desired composite sheet of material 20 will result.

Figure 2:
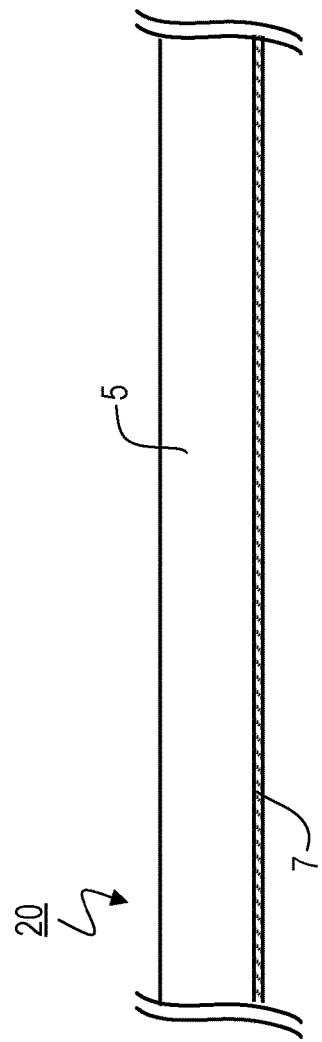
FIG. 2 illustrates a sectional view of a sample composite sheet material according to the first representative embodiment of the present invention.

In the foregoing embodiment, fabric sheet material 7 is embedded into a preferably non-fibrous material 5. An example of the resulting composite sheet material 20 is illustrated in FIG. 2. As shown, the top layer of composite sheet material 20 is made of the base material 5, and the bottom layer consists largely of the fabric sheet material 7, with the layer of base material 5 ordinarily being significantly thicker than the layer of fabric sheet material 7.

Figure 3:
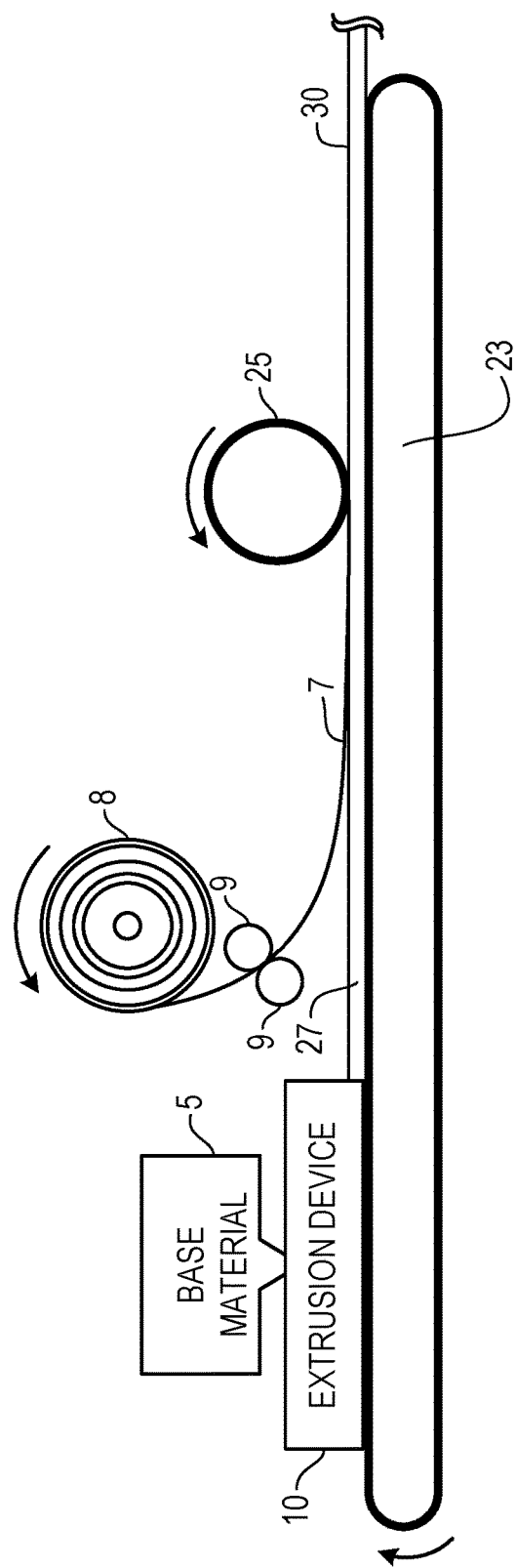
FIG. 3 is a right side conceptual view of a system for making a composite sheet material according to a second representative embodiment of the present invention.
Figure 4:
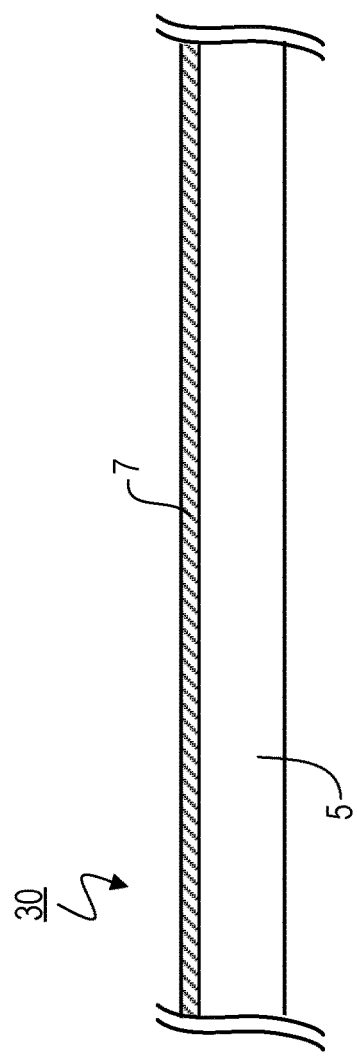
FIG. 4 illustrates a sectional view of a sample composite sheet material according to the second and third representative embodiments of the present invention.

However, in alternate embodiments, the sheet of fabric material 7 is pressed onto the non-fibrous base material 5 after the non-fibrous base material 5 has exited the extrusion die and/or roller 25 and is still in a liquid or semi-liquid state, i.e., in an uncured state. One example of this is shown in FIG. 3. In this embodiment, the sheet of fabric material 7 is laid onto an extruded sheet 27 made entirely of base material 5 only after the base material 5 has exited extrusion device 10. According to one sub-embodiment, extruded sheet 27 is approximately 6-7 millimeters (mm) thick. Thereafter, fabric material 7 is pressed into the surface of extruded sheet 27 using roller 25, thereby forming composite sheet material 30. According to one sub-embodiment, composite sheet material 30 is approximately 4-5 mm thick. As shown in FIG. 4, the composite sheet material 30 has a bottom layer of base material 5 and a thinner top layer into which the fabric material 7 has been embedded.

Figure 5:
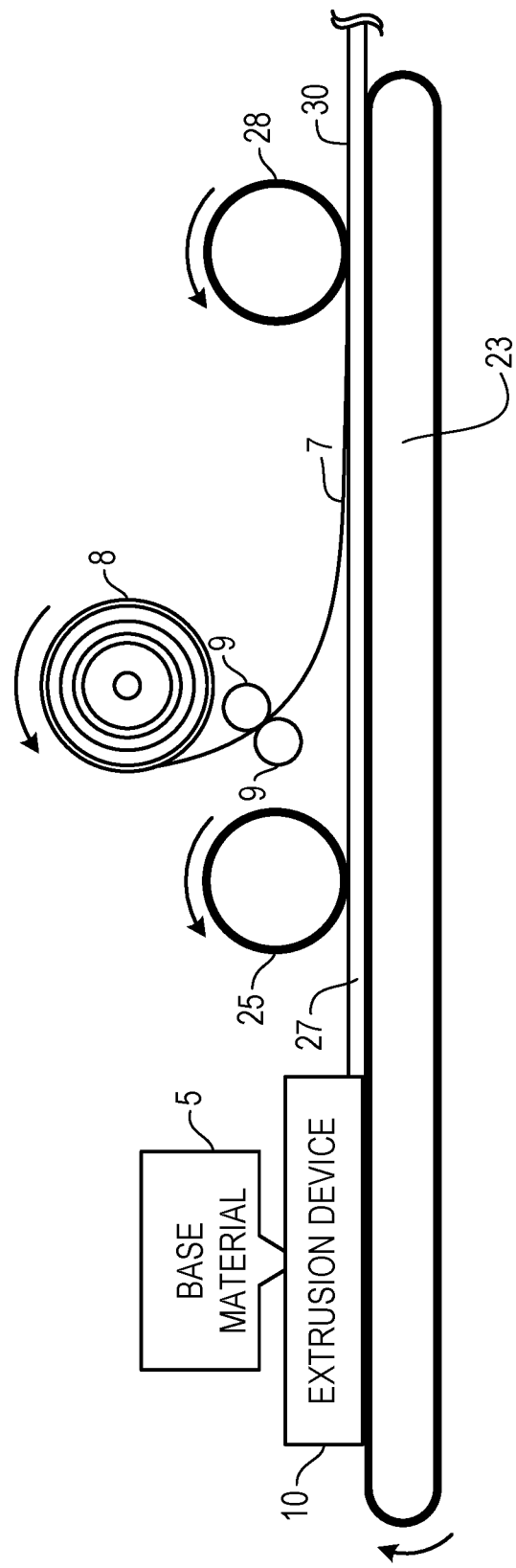
FIG. 5 is a right side conceptual view of a system for making a composite sheet material according to a third representative embodiment of the present invention.

FIG. 5 illustrates another of the embodiments noted above. Here, the extruded sheet 27 of base material 5 first passes underneath roller 25, e.g., for shaping and/or cooling. Only after that is the sheet of fabric material 7 laid on top of extruded sheet 27 and then pressed into sheet 27 by roller 28. However, essentially the same composite sheet material 30 results from this process as resulted from the preceding process. In certain sub-embodiments, extruded sheet 27 is approximately 6-7 mm thick, and composite sheet 30 is approximately 4-5 mm thick.

Alternate embodiments use individual fibers, rather than a sheet of fabric material 7, in a technique similar to that described above. In still further embodiments where individual fibers are to be embedded into the non-fibrous material 5, the fibers may be pre-mixed together with the liquid or semi-liquid base material 5.

Thus, in certain embodiments, individual fibers are sprinkled or sprayed, during the shaping process or afterward (e.g., on the conveyor belt before the non-fibrous material has hardened or has fully hardened). For example, in one representative embodiment where two or more consecutive rollers are being used, the fibers are sprinkled or sprayed between the rollers. Such an embodiment might be implemented where, for example, only one side of the resulting composite sheet material is desired to have a composite surface, and/or one wishes to be sure that the individual fibers form a significant part of the surface area for the resulting composite sheet.

Figure 6:
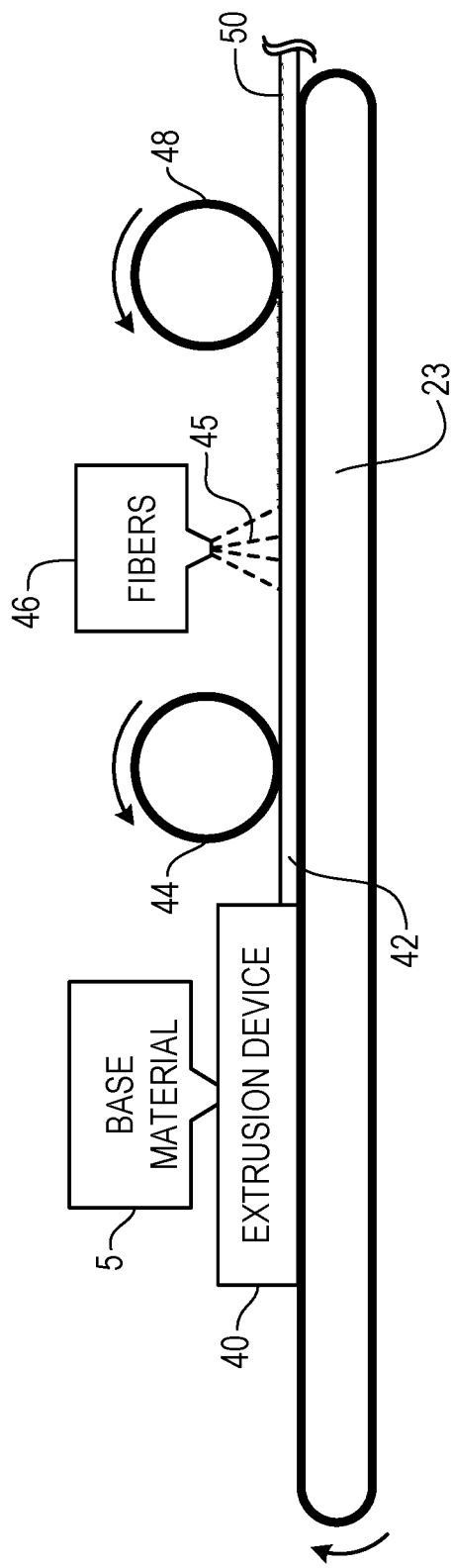
FIG. 6 is a right side conceptual view of a system for making a composite sheet material according to a fourth representative embodiment of the present invention.

An example of such a technique is shown in FIG. 6. Here, a sheet 42, consisting only of base material 5, is extruded by extrusion device 40. Accordingly, this portion of this embodiment is identical to certain conventional extrusion techniques. A first roller 44 then smooths and/or partially cools sheet 42. Thereafter, a number of individual fibers 45 (or, in certain alternate embodiments, other particles, preferably particles of natural materials) are deposited onto the upper surface of sheet 42 by device 46. In this regard, device 46 may be implemented, e.g., as a sprayer or as a sifter. One example of the latter is a container with a sieve for a lower surface, where the container is shaken or vibrated in order to cause the fibers 45 to the sprinkled down onto the surface of sheet 42.

Figure 7:
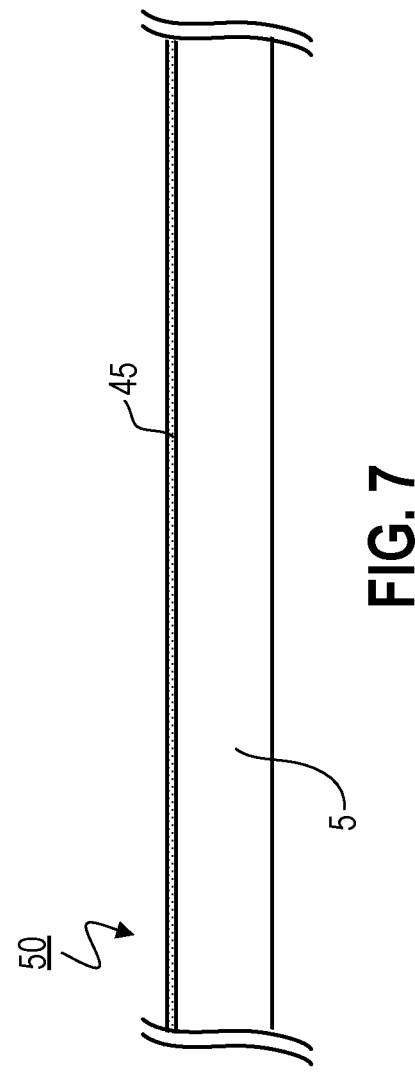
FIG. 7 illustrates a sectional view of a sample composite sheet material according to the fourth representative embodiment of the present invention.

Finally, roller 48 presses the fibers 45 into the surface of sheet 42, resulting in a composite sheet 50, and in some cases simultaneously providing additional cooling. As shown in FIG. 7, sheet 50 has a lower layer that is formed of base material 5 and a thinner upper layer that has fibers 45 embedded within it. In certain sub-embodiments, extruded sheet 42 is approximately 6-7 mm thick, and composite sheet 50 is approximately 4-5 mm thick.

Figure 8:
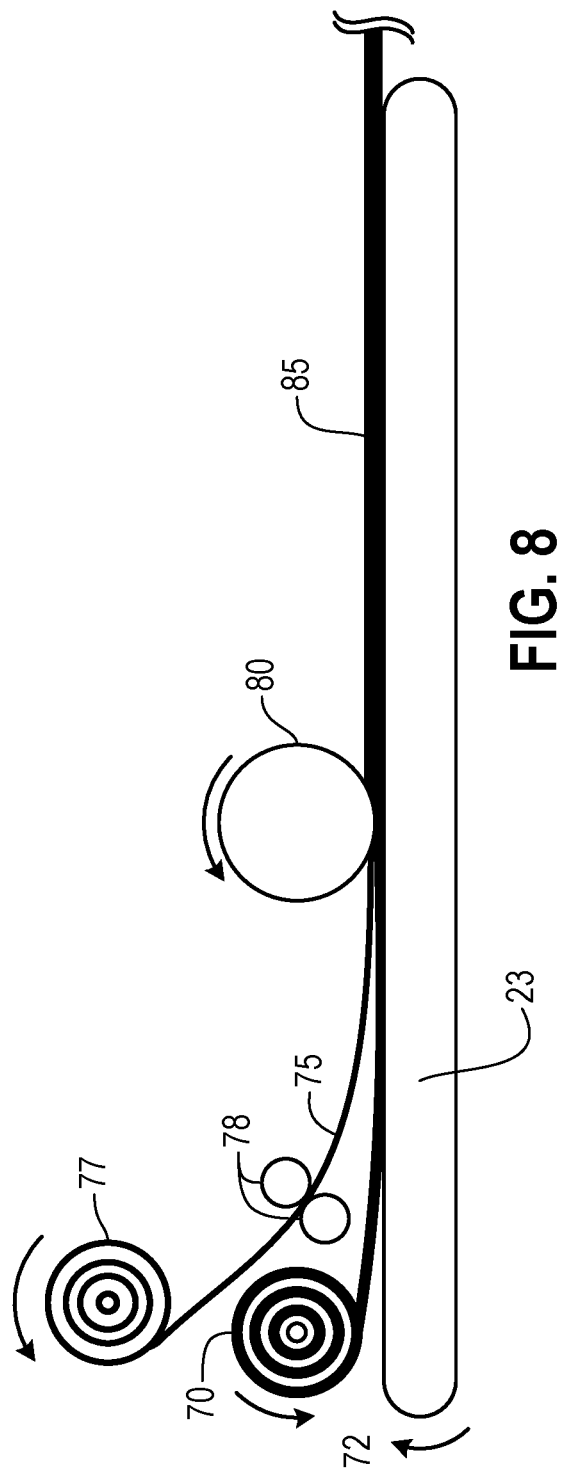
FIG. 8 is a right side conceptual view of a system for making a composite sheet material according to a fifth representative embodiment of the present invention.
Figure 9:
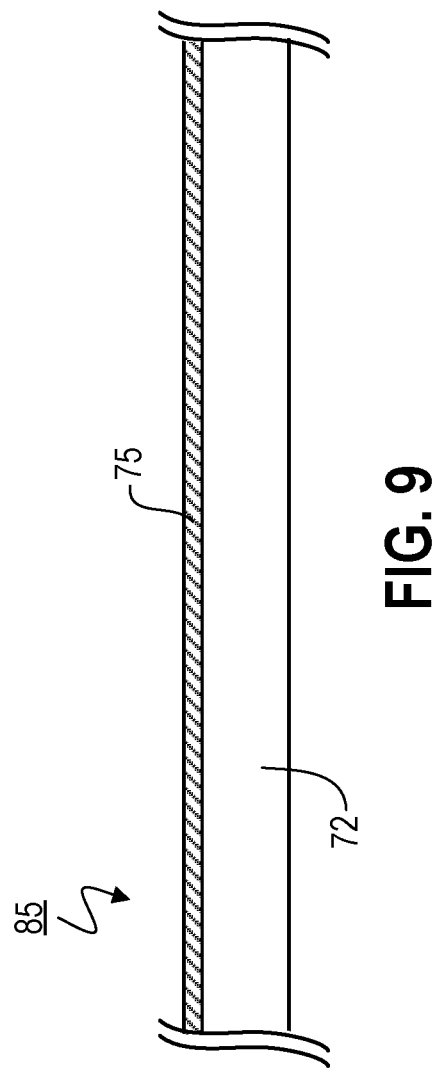
FIG. 9 illustrates a sectional view of a sample composite sheet material according to the fifth representative embodiment of the present invention.

The second general class of embodiments contemplated by the present invention involves the impression of a plurality of individual fibers or a sheet of fabric material into the surface of a pre-manufactured sheet of non-fibrous material. An example is illustrated in FIG. 8.

Preferably, a roll 70 of such pre-manufactured non-fibrous base sheet material 72 (e.g., made from any of the types of base material 5 mentioned above) is first obtained. For example, such sheet material 72 might have been previously fabricated using a conventional extrusion process. A sheet of fabric material 75 (e.g., drawn from a roll 77) is placed on one side (typically the upper side) of the non-fibrous material 72 (e.g., using guiding rollers 78), and the combination of the base sheet material 72 and the fabric sheet material 75 is passed underneath one or more heated rollers 80, which apply heat and pressure, partially melting the surface of the non-fibrous material 72 and causing the fabric material 75 to embed into it, resulting in composite sheet material 85.

A similar technique can be applied by coating the non-fibrous sheet of material with individual fibers (instead of fabric sheet material) and then passing the combination underneath heated rollers 80. Still further, depending upon the type of the non-fibrous sheet material 72, chemical or radiation techniques may be utilized to temporarily soften the surface of the non-fibrous material so that the sheet of fabric material or individual fibers can be embedded into it, or even pressure alone can be used to embed the fibrous material (e.g., fabric sheet material 75 or individual fabric fibers) into the non-fibrous material 72.

In any of the embodiments discussed above, the extrusion die and/or any of the rollers may result in relatively flat surfaces for the resulting sheet material or instead may be shaped so as to form or impress a three-dimensional pattern, such as a tread pattern for embodiments in which the resulting composite sheet material is to be used in a shoe outsole.

Also, in alternate embodiments the fabric or fibrous materials described above may be replaced by various other kinds of materials. For example, sheets or individual particles of leather, reconstituted leather, cork, paper, corn husks, hemp, other organic materials that have long fibers (e.g., for the purpose of adding strength to the finished product for wear improvement), any other plant material, or any other natural or synthetic material (or mixture of materials, such as a composite compound or mixture of organic materials) may be embedded into a sheet of base material 5 or otherwise used to form a composite sheet material using any of the techniques described above.

In some of the embodiments described above, the rollers provide a cooling effect. In other embodiments, e.g., where other types of materials such as one where natural or synthetic rubber is used, the rollers may be heated in order to effect or assist in curing.

Still further, although the embodiments described above contemplate a single layer of fabric or fibers in a single layer of base material 5, in alternate embodiments, multiple (e.g., alternating) layers of such materials may be used. In order to produce a composite sheet material or a finished article having such multiple layers, the techniques described above may be repeated, or individual composite sheets may be joined together, e.g., by gluing, using a vulcanization process or in any of a variety of other ways.

Generally speaking, in the foregoing embodiments only a single side of the non-fibrous base material is embedded with fibrous material. However, in alternate embodiments both sides of the non-fibrous base material are embedded with fibrous material, which may be the same on both sides or different fibrous materials may be used for the two different sides.

Figure 10:
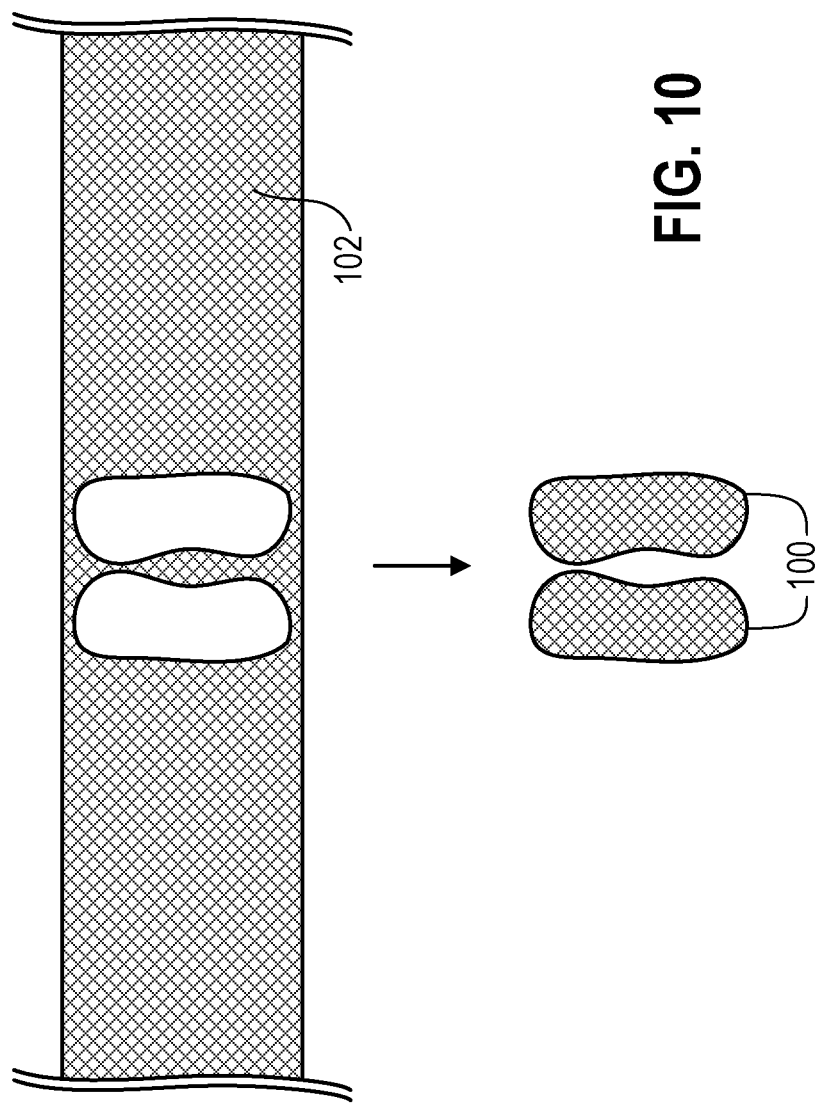
FIG. 10 illustrates the cutting of a shoe outsole from a sheet of composite material.

In any event, once a sheet of composite material has been manufactured in accordance with any of the foregoing techniques, it can be cut into any desired shapes and used for any desired purpose. As noted above, one such purpose is to fabricate the outsole of a shoe. Thus, as shown in FIG. 10, a pair of entire shoe outsoles 100 has been cut from a sheet of composite material 102. Alternatively, one or more portions of a shoe's outsole may be cut from composite sheet material 102 and used in fabricating a shoe's outsole, e.g., by combining such portion(s) with other elements. For instance, in one such embodiment, pieces of a shoe's outsole cut from composite sheet material are attached to a larger section of the shoe's outsole using a vulcanization process.

Outsole or Sheet Material with Particles Bonded to Indentations.

In the following embodiments of the invention, portions of the bottom of a shoe or the surface of a sheet material are covered with a plurality of small particles. Preferably, the particles are fibers and, more preferably, natural fibers that cover only a portion of the bottom surface of the shoe or sheet material. Initially, the following discussion concerns the bottom surface of a shoe and then the same concepts are extended with respect to a general-purpose sheet material.

In the preferred embodiments of the invention, individual fibers are flocked onto the bottom of the shoe (i.e., using techniques that tend to cause them to embed at a substantially right angle to the surface). However, other gluing or bonding techniques instead may be used, or in certain cases the fibers or other small particles (either individually or after being flocked or otherwise bonded onto a sheet of backing material) may even be molded or pressed into the bottom surface of the shoe.

Figure 11:
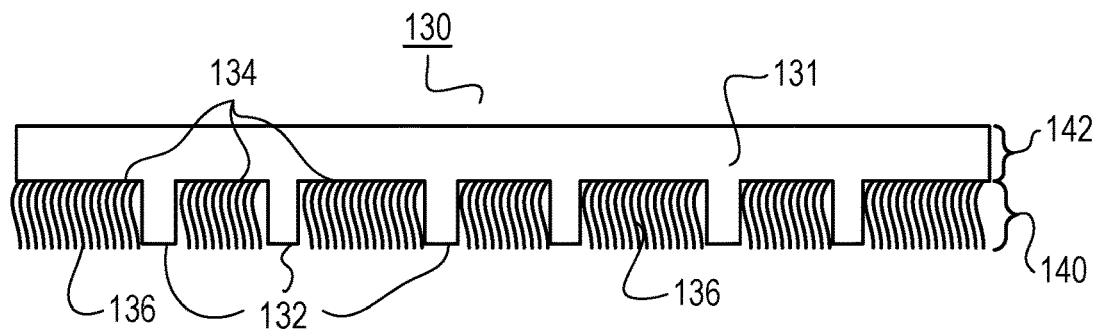
FIG. 11 illustrates a cross-sectional view of a shoe's outsole or of a piece of sheet material, according to representative embodiment of the present invention, in which the fibers are bonded to indentations in the base material at a substantially right angle.

FIG. 11 depicts a cross-sectional view of a shoe's outsole 130. The term "outsole" as used herein refers to the bottom portion or layer of a shoe (i.e., the portion that is adjacent to the ground in normal use). Accordingly, the term outsole may encompass, e.g., the bottom portion of a shoe's heel, where a separate (e.g., an elevated) heel is used. As shown in FIG. 11, the base material 131 of the shoe's outsole has an arrangement of alternating areas in which lower-extending portions 132 (which actually contact the ground in normal use) alternate with indentations 134, which ordinarily would not contact the ground in normal use, but which are covered with natural fibers (or other small particles) 136 that do contact the ground.

In the present embodiment, fibers 136 have been flocked onto the appropriate sections of the bottom of outsole 130. As shown, the flocked fibers 136 extend from the indentations 134 down to approximately the same level as the lower-extending portions 132, so that both the fibers 136 and the lower-extending portions 132 ordinarily will contact the ground in normal use. Because the fibers 136 generally will be softer and more compressible, in certain embodiments of the invention they actually can extend below the surfaces of the lower-extending portions 132 (in their uncompressed state), e.g., slightly below such surfaces, so that when weight is applied they are compressed down to the same level as the surfaces of the lower-extending portions 132.

Figure 12:
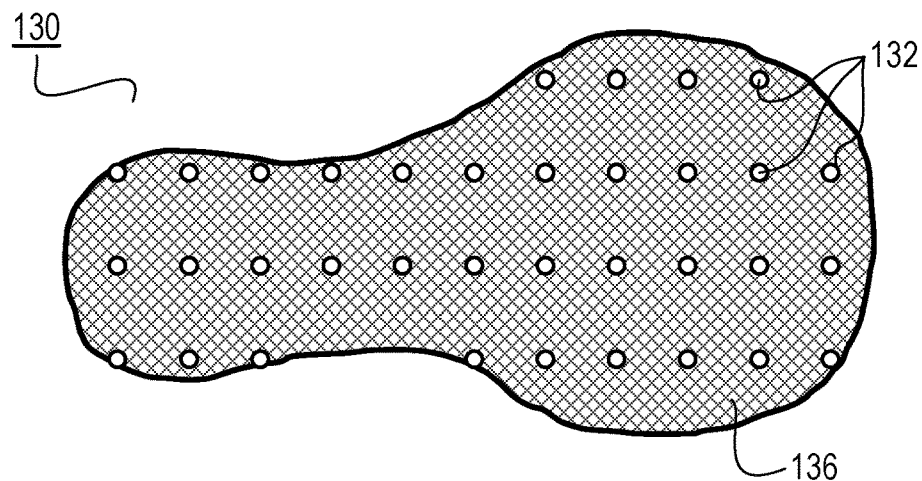
FIG. 12 illustrates a pattern covering the bottom of the shoe's outsole in which lower-extending portions alternate with bonded particles, according to a first representative embodiment of the invention.
Figure 13:
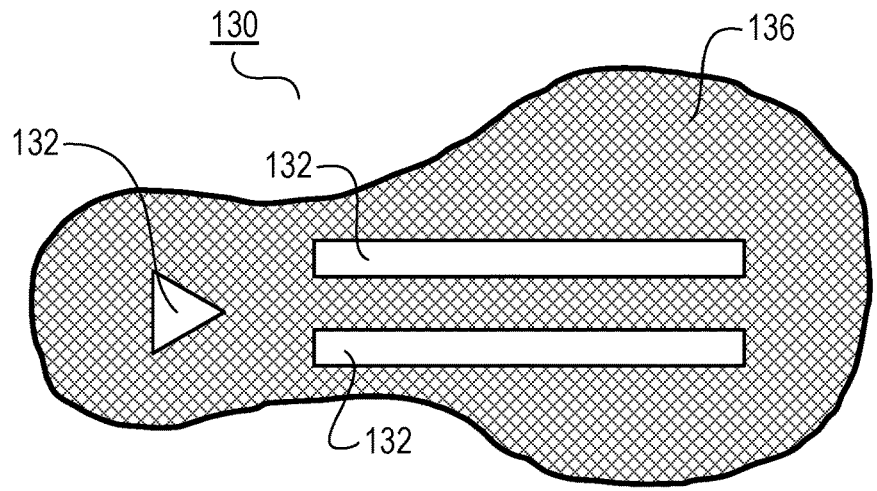
FIG. 13 illustrates a pattern covering the bottom of the shoe's outsole in which lower-extending portions alternate with bonded particles, according to a second representative embodiment of the invention.

FIGS. 12 and 13 illustrate different patterns in which the lower-extending portions 132 alternate with the natural fibers 136. In both patterns, all of the lower-extending portions 132 of the base material 131 for outsole 130 are uncoated and all of the indentations 134 are coated with the natural fibers 136, e.g., such fibers 136 having been flocked on. In alternate embodiments only some of the lower-extending portions 132 are covered with the fibers or other small particles 136 and/or some or all of the indentations 134 may be coated with some of the small particles 136. However, in the preferred embodiments at least some of the protrusions 132 are substantially uncoated with such fibers or other small particles 136. That is, the present invention contemplates a differential coating in which the indentations 134 are coated with the small particles 136 to a greater extent than the protrusions 132.

In FIG. 12, the base material 131 is formed so as to have a repeating pattern in which the lower-extending portions 132 are arranged in a regular grid. In FIG. 13, the lower-extending portions 132 are arranged in a more decorative design, with fewer such lower-extending portions 132, but with each such portion 132 being larger than those of FIG. 12.

In alternate embodiments, any combination of regular patterns and/or more decorative designs may be used, and any sizes and/or combinations of sizes may be used in order to achieve any desired functional and/or aesthetic purpose. However, in the preferred embodiments, the areas of the bottom of the shoe covered by the fibers (or other particles) 136 constitute 50% or more of the surface area of the shoe's outsole 130 that contacts the ground in normal use. More preferably, the areas covered by the fibers (or other particles) 136 constitute at least 50-90% of the surface area of the shoe's outsole 130 that contacts the ground in normal use.

The foregoing patterns can be achieved by manufacturing the base material 131 so as to have the desired protrusions 132 and indentations 134, e.g., from any natural or synthetic material (e.g., EVA, PVC or synthetic rubber). In the preferred embodiments, base material 131 is injection-molded or otherwise molded in sheet form and then cut to the desired size and shape, as described in more detail below. It is noted that the regular repeating pattern of FIG. 12 typically will be easier to manufacture, and often can be produced simply using an extrusion process, as described above.

In any event, adhesive is applied only (or primarily, e.g., as a result of manufacturing errors or to achieve a desired aesthetic effect) to the indentations 134 (e.g., by using a pattern of glue touch-points that matches the pattern of indentations 134, by using a spray template, or by manually applying glue only or primarily to the indentations 134). The end result is that the indentations 134 (or at least selected ones of such indentations 134) predominantly will be coated with the flocking or other particles 136, while the protrusions 132 predominantly will be uncoated with such flocking or other particles 136. Next, the fibers 136 are applied, e.g., by flocking or simply blowing the fibers 136. Finally, any fibers 136 that attached to the lower-extending portions 132 preferably are ground off. Alternatively, the entire bottom of the shoe, protrusions 132 and indentations 134, can be flocked or otherwise coated with fibers 136, and then the fibers 136 can be ground off from the lower-extending portions 132.

In the preferred embodiments, the protrusions 132 extend only slightly below the indentations 134, e.g., so that the depth 140 of the indentations 134 to be coated with the fibers 136 is less than 5 millimeters (mm), or even as shallow as 0.1 mm, but, more preferably, is approximately 1-2 mm. As a result, fibers 136 of approximately that length can be used to achieve the desired effect. Similarly, the thickness 142 of the base material 131, disregarding the protrusions 132, preferably also is less than 5 mm, again even as thin as 0.1 mm, but, more preferably, is approximately 1-2 mm.

One advantage of the foregoing configuration is that, because different types of materials contact the ground simultaneously, the resulting shoe can be manufactured so as to have good traction on a variety of different surfaces. In such a case, for example, the base material 131 might be optimized for one type of surface while the fibers 136 are optimized for another.

Another advantage, particularly with respect to embodiments in which the fibers 136 in their uncompressed state extend beyond the surface of the lower-extending portions 132, is that the fibers 136 can be selected so as to provide a unique two-stage cushioning effect. In such embodiments, a relatively soft cushioning effect is achieved as the fibers 136 contact the ground first and then are crushed and compressed. Eventually, when the fibers 136 have been sufficiently compressed, the base material 131 also contacts the ground and therefore begins to absorb the force, typically providing a firmer cushioning effect.

Figure 14:
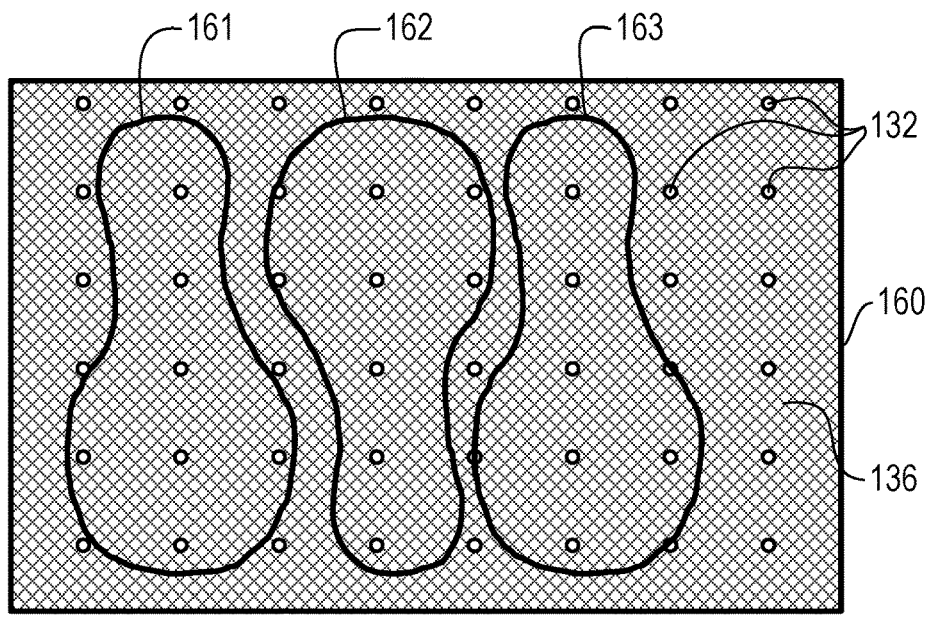
FIG. 14 illustrates one example of a portion of a sheet material, having the same surface pattern as that shown in FIG. 12, according to a representative embodiment of the present invention.

It is noted that the foregoing construction can be applied to sheets of material 131 that may then be cut into any desired shapes, sizes and/or patterns, and then used for any of a variety of different purposes. FIG. 14 illustrates one example of a portion of a sheet material 160 having a pattern that is similar to the pattern shown in FIG. 12, i.e., with a regular grid of lower-extending portions 132 and with the indentations between such lower-extending portions 132 having been flocked (or otherwise coated) with natural fibers 136. The cross-section of sheet material 160 might be, e.g., similar or identical to the cross-section shown in FIG. 11, e.g., with the same preferred dimensions. In the preferred embodiments, the sheet material 160 is manufactured on a continuous basis, rolled and then cut when a roll of the desired size is finished.

Thereafter, such material may be used in manufacturing a wide variety of products. As mentioned above, one use of such material is for the outsole of a shoe. Thus, for example, each of patterns 161-163 may be cut out of the sheet material 160 and then glued or otherwise attached to another component of the shoe in order to form all or portions of the bottom surface of a completed shoe.

Figure 15:
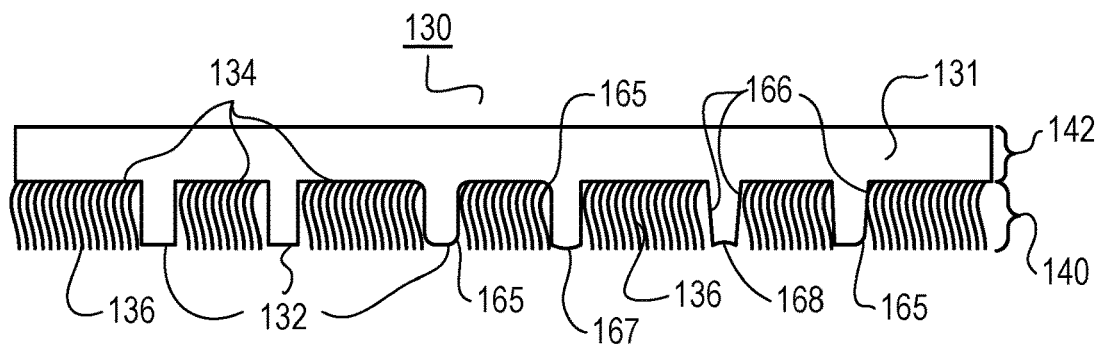
FIG. 15 illustrates a cross-sectional view of a shoe's outsole or of a sheet material according to an alternate representative embodiment of the present invention, in which the protrusions and indentations have varying contours.

A number of variations on the foregoing embodiments are possible. For example, although the protrusions 132 and the indentations 134 are shown in FIG. 11 as having flat surfaces and right-angle edges, any other shapes or designs may be used. Either or both of the protrusions 132 and indentations 134 may be rounded, have triangular, trapezoidal or pyramid shapes (e.g., so that the protrusions 132 resemble pinnacles), or have any other two-dimensional or a three-dimensional shape. An example is illustrated in FIG. 15, in which the various protrusions 132 and indentations 134 include rounded corners 165, sloping edges 166, convex surfaces 167 and concave surfaces 168. Generally speaking, however, flat or nearly flat surfaces and the use of flocking will help to ensure that the heights of the fibers 136 are approximately the same as the heights of the protrusions 132.

Figure 16:
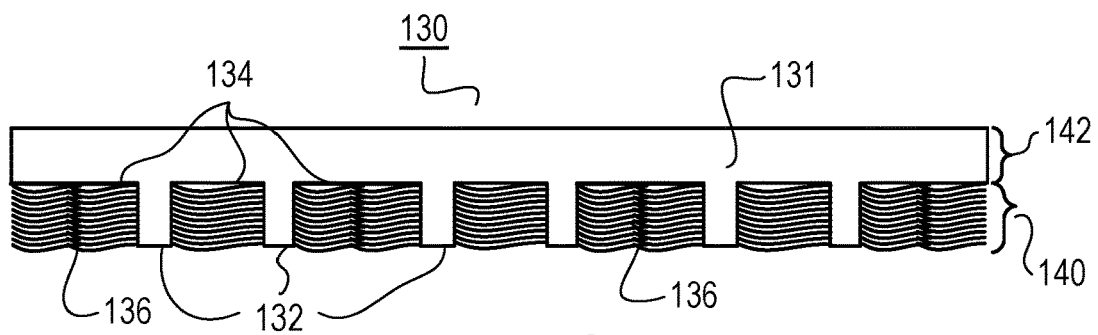
FIG. 16 illustrates a cross-sectional view of a shoe's outsole or of a piece of sheet material according to an alternate representative embodiment of the present invention in which the fibers are bonded in a substantially parallel manner to indentations in the base material.

Also, although the fibers 136 generally are shown in the drawings and described above as having been flocked on (i.e., so they tend to embed at a right angle), such fibers instead may be attached to the base material 131 so that they are approximately parallel to the plane formed by the base material (e.g., in a matted-down or flattened configuration). Such a configuration is illustrated in FIG. 16. In such a case, the fibers 136 may be attached by allowing adhesive material to seep through the fibers 136, or by using any combination of adhesive material, heating and rolling to bind such fibers 136 to the base material 131.

Completing Construction of the Entire Shoe.

The foregoing discussion focuses on the construction of a shoe's outsole, e.g., the bottom layer of the shoe which is adjacent to the ground in normal use. Once an outsole according to the present invention has been constructed it can be joined in any known manner to the other components of a shoe in order to complete construction of the shoe. For example, the outsole maybe glued or bonded to a midsole or may be molded together with other portions of the shoe's sole. Alternatively, the base material for the outsole may be already attached to other components for the shoe or to the entire rest of the shoe before particles are attached to such base material, as described herein. The specific technique for completing construction of the entire shoe typically will depend upon the type of the shoe which is being manufactured, and the present invention applies to a wide variety of open shoes (e.g., sandals and thongs) and closed shoes (e.g., boots, athletic shoes, dress shoes and casual shoes).

Additional Considerations.

It is noted that the selection of the fibrous and non-fibrous materials for use in the methods of the present invention preferably depends upon the desired characteristics of the resulting composite material. Although certain specific examples of materials have been provided above, any other materials instead may be used.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of making a shoe sole, comprising:
   (a) obtaining a piece of base material that has, on its bottom surface, a plurality of indentations and a plurality of protrusions;
   (b) bonding a plurality of small individual particles to the bottom surface of said base material;
   (c) grinding off ones of the small individual particles that attached to the protrusions during step (b), thereby providing a partially coated piece of base material having a bottom surface that is partially coated with said small individual particles; and
   (d) fabricating a shoe sole by using the partially coated piece of base material to form a bottom layer of said shoe sole, so that the bottom surface of said partially coated piece of base material is adjacent to the ground during normal use of said shoe sole.

2. A method according to claim 1, wherein the bonding during step (b) comprises flocking.

3. A method according to claim 1, wherein upon completion of step (d), the small individual particles extend from the indentations down to approximately the same level as the protrusions.

4. A method according to claim 1, wherein the small individual particles are compressible and, upon completion of step (d), extend from the indentations down to slightly below the protrusions, so that when weight is applied said small individual particles are compressed down to a same level as the protrusions.

5. A method according to claim 1, wherein, upon completion of step (d), the small individual particles constitute at least 50% of the bottom surface of said partially coated piece of base material.

6. A method according to claim 1, wherein the base material is comprised of at least one of ethylene vinyl acetate (EVA), polyvinyl chloride (PVC) or synthetic rubber.

7. A method according to claim 1, wherein, upon completion of step (d), the indentations predominantly are coated with the small individual particles, while the protrusions predominantly are uncoated with said small individual particles.

8. A method according to claim 1, wherein a depth of the indentations is approximately 1-2 millimeters (mm).

9. A method according to claim 1, further comprising a step of cutting an outsole component from the partially coated piece of base material, and wherein said outsole component then is used as the bottom layer of said shoe sole in step (d).

10. A method according to claim 1, wherein said small individual particles are individual fibers.

11. A method according to claim 1, wherein a depth of the indentations is less than 5 millimeters (mm).

12. A method according to claim 1, further comprising steps of:
   manufacturing sheet material on a continuous basis; and
   cutting the piece of base material from said sheet material.

13. A method according to claim 12, wherein said sheet material is manufactured using an extrusion process.

14. A method according to claim 1, further comprising a step, performed prior to step (b), of applying glue primarily to the indentations by using a pattern of glue touch-points that matches the indentations.

15. A method according to claim 1, wherein the entire bottom surface of said base material is coated with said small individual particles during said step (b).

16. A method according to claim 1, wherein the base material and the small individual particles have been selected so as to have good traction on different types of surfaces.

\* \* \* \* \*

UNITED STATES PATENT AND TRADEMARK OFFICE
CERTIFICATE OF CORRECTION

Page 1 of 1

PATENT NO.         : 11,109,640 B2
APPLICATION NO.    : 16/583472
DATED              : September 7, 2021
INVENTOR(S)        : John Koo and Jonathan Goldberg It is certified that error appears in the above-identified patent and that said Letters Patent is hereby corrected as shown below:

On the Title Page

Item [54], and in the Specification Column 1 Line 1 delete "Shoe Outsole Made Using Composite Sheet Material" and insert --Shoe Sole Made by Bonding Particles and Then Grinding Off Ones That Attach To Protrusions--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*